United States Patent
Fu et al.

(10) Patent No.: US 7,303,326 B2
(45) Date of Patent: Dec. 4, 2007

(54) BACKLIGHT MODULE AND LIQUID CRYSTAL DISPLAY HAVING SAME

(75) Inventors: Zhi-Feng Fu, Shenzhen (CN); Yu-Liang Huang, Miao-Li (TW)

(73) Assignees: Innocom Technology (Shenzhen) Co., Ltd., Shenzhen, Guangdong Province (CN); Innolux Display Corp., Chu-Nan, Miao-Li County (TW)

( * ) Notice: Subject to any disclaimer, the term of this patent is extended or adjusted under 35 U.S.C. 154(b) by 0 days.

(21) Appl. No.: 11/409,854

(22) Filed: Apr. 24, 2006

(65) Prior Publication Data

US 2006/0238670 A1  Oct. 26, 2006

(30) Foreign Application Priority Data

Apr. 22, 2005 (TW) ............... 94206388 U

(51) Int. Cl.
F21V 7/04 (2006.01)
(52) U.S. Cl. .................. 362/630; 362/628; 362/633

(58) Field of Classification Search ............... 362/614, 362/615, 617, 619, 623, 624, 627, 628, 630, 362/631, 632, 633, 634; 349/58, 65
See application file for complete search history.

(56) References Cited

U.S. PATENT DOCUMENTS

| | | | |
|---|---|---|---|
| 3,450,870 A | * | 6/1969 | Curl ........................... 362/632 |
| 5,613,751 A | * | 3/1997 | Parker et al. ............... 362/627 |
| 5,774,199 A | * | 6/1998 | Ozawa ....................... 362/633 |
| 6,609,808 B2 | | 8/2003 | Chen |

* cited by examiner

Primary Examiner—Y. My Quach-Lee
(74) Attorney, Agent, or Firm—Wei Te Chung

(57) ABSTRACT

An exemplary backlight module (2) includes a light guide plate (21) and a light source (20). The light guide plate includes a body (211) and a protrusion (212) extending from the body. The body includes a light emitting surface (2111) and a side surface (2112) adjacent the light emitting surface. The light source includes a wire (22) which is disposed in a space defined between the side surface and the protrusion. The backlight module is compact with a reduced length.

9 Claims, 5 Drawing Sheets

BACKLIGHT MODULE AND LIQUID CRYSTAL DISPLAY HAVING SAME

FIELD OF THE INVENTION

The present invention relates to backlight modules and liquid crystal displays having a backlight module.

GENERAL BACKGROUND

A typical liquid crystal display is capable of displaying a clear and sharp image through millions of pixels that make up the complete image. The liquid crystal display has thus been applied to various electronic equipment in which messages or pictures need to be displayed, such as mobile phones and notebook computers. However, liquid crystals in the liquid crystal display do not themselves emit light. Rather, the liquid crystals have to be lit up by a light source so as to clearly and sharply display text and images. The light source may be ambient light, or a backlight module attached to the liquid crystal display.

Referring to FIG. 8, a conventional backlight module 1 generally includes a light guide plate 11, a light source 10 having a wire 12, and a frame 13 for accommodating the light guide plate 11 and the light source 10.

Referring to FIG. 9, the light guide plate 11 includes a side surface 111 and a top light emitting surface 112. The frame 13 has an L-shaped transverse cross-section. Top portions of the frame 13 cover a periphery of the emitting surface 112 of the light guide plate 11. An inner surface 131 of the frame 13 cooperates with the side surface 111 of the light guide plate 11 to form a space for accommodating the wire 12.

With this configuration, the space between the side surface 111 of the light guide plate 11 and the inner surface 131 of the frame 13 is provided in order that the wire 12 can be disposed between the light guide plate 11 and the frame 13. That is, the space is an additional expanse that increases an overall length of the backlight module 1. This militates against the trend toward miniaturization of corresponding electronic equipment such as mobile phones and notebook computers.

Therefore, a new backlight module that can overcome the above-described problem is desired.

SUMMARY

A backlight module includes a light guide plate and a light source. The light guide plate includes a body and a protrusion extending from the body. The body includes a light emitting surface and a side surface adjacent the light emitting surface. The light source includes a wire which is disposed in a space defined between the side surface and the protrusion. The backlight module is compact.

Other advantages and novel features will become more apparent from the following detailed description when taken in conjunction with the accompanying drawings.

DETAILED DESCRIPTION OF PREFERRED EMBODIMENTS

Figure 1:
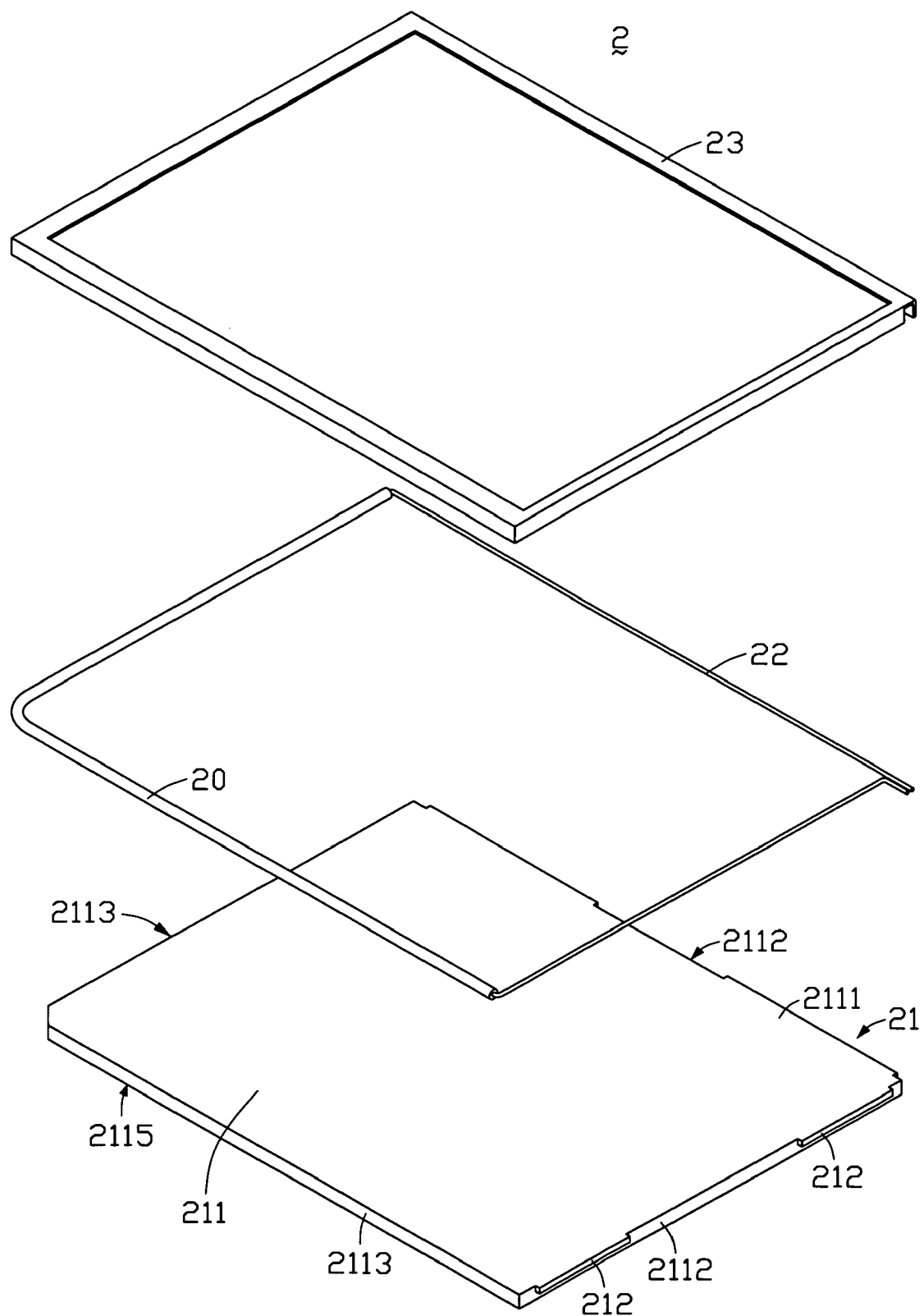
FIG. 1 is an exploded, isometric view of a backlight module according to a first embodiment of the present invention.
Figure 2:
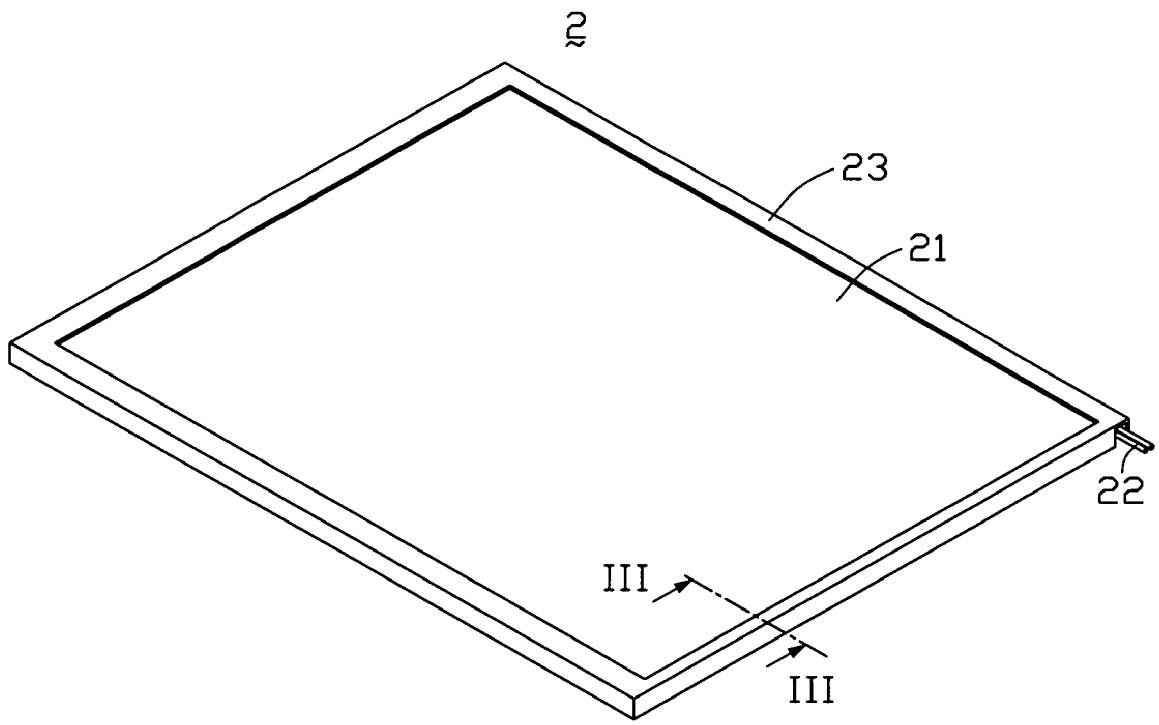
FIG. 2 is an assembled view of the backlight module of FIG. 1.

Referring to FIGS. 1 and 2, a backlight module 2 according to a first embodiment of the present invention includes a light guide plate 21, a light source 20 having a wire 22, and a plastic frame 23. The light guide plate 21 is a rectangular sheet, and includes a body 211 and four protrusions 212. The body 211 includes a light emitting surface 2111, a bottom surface 2115 opposite to the emitting surface 2111, two adjacent side surfaces 2112 perpendicular to the bottom surface 2115, and two adjacent light incident surfaces 2113 perpendicular to the bottom surface 2115. Each pair of protrusions 212 are integrated with a respective one of the side surfaces 2112, and extend from the side surface 2112. The light source 20 can be an L-shaped cold cathode fluorescent lamp (CCFL).

Figure 3:
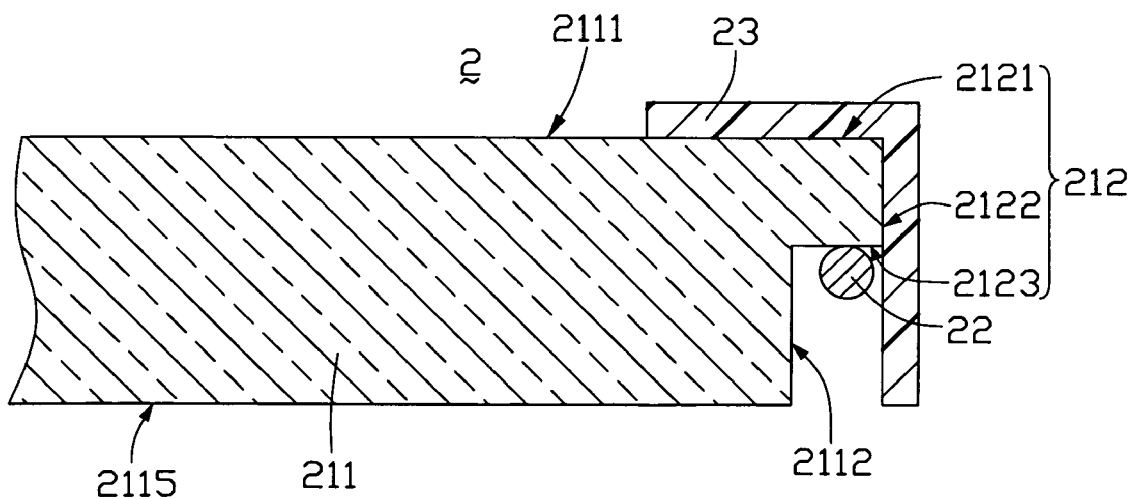
FIG. 3 is a cross-sectional view taken along line III-III of FIG. 2.
Figure 4:
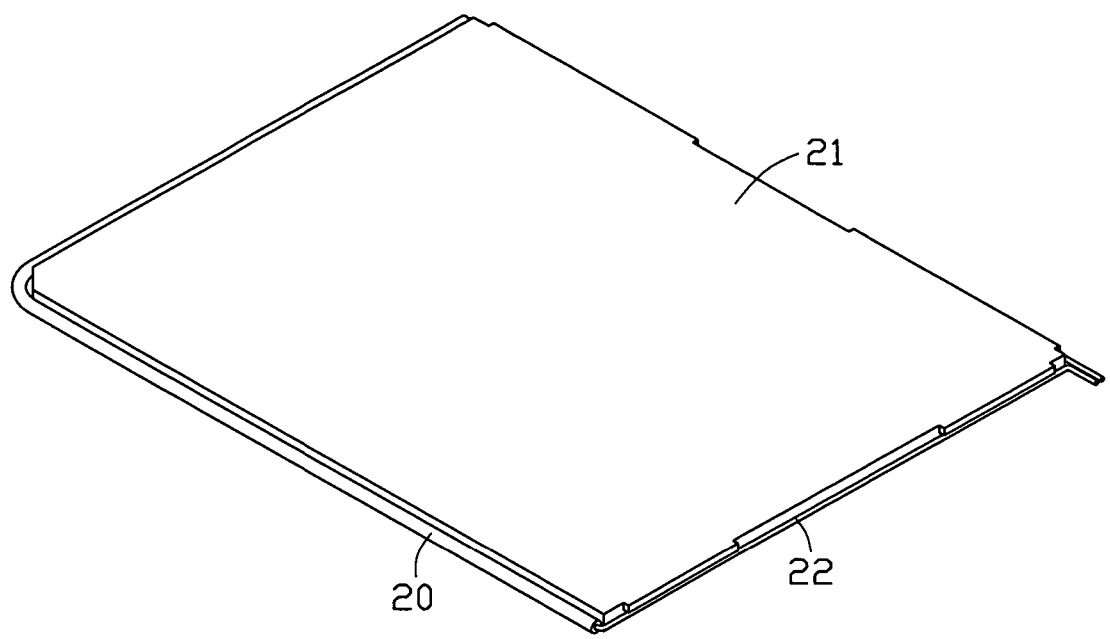
FIG. 4 is an isometric view showing an assembly of a light guide plate and a light source of the backlight module of FIG. 1

Also referring to FIGS. 3 and 4, each protrusion 212 has a rectangular transverse cross-section, and includes a first surface 2121, a second surface 2122 and a third surface 2123. The first surface 2121 is essentially in a same plane as the emitting surface 2111 of the light guide plate 21. The second surface 2122 interconnects the first and third surfaces 2121, 2123. The third surface 2123 is parallel and opposite to the first surface 2121. The plastic frame 23 has a generally L-shaped transverse cross-section.

In assembly, the light guide plate 21 and the light source 20 are loosely attached together, and are then accommodated in the plastic frame 23. Two inner surfaces (not labeled) of the plastic frame 23 respectively cover the first and second surfaces 2121, 2122 of the protrusions 212. The light source 20 and the wire 22 cooperatively form a rectangular loop, which has a suitable size for fittingly surrounding the light incident and side surfaces 2113, 2112 of the light guide plate 21. That is, the light source 20 is disposed adjacent to the light incident surfaces 2113, and the wire 22 is accommodated in an L-shaped space defined between the side surfaces 2112 of the body 211, the third surfaces 2123 of the protrusions 212, and the inner surfaces of the plastic frame 23. Each side surface 2112 has reflective material coated thereon, for preventing light beams from leaking out through the side surface 2112 and being absorbed by the wire 22. The bottom surface 2115 also has reflective material coated thereon, for preventing light beams from leaking out therethrough.

Because the wire 22 is accommodated in the L-shaped space defined by the side surfaces 2112 of the body 211, the third surfaces 2123 of the protrusions 212 and the inner surfaces of the plastic frame 23, the wire 22 does not require additional space. That is, an overall size of the backlight module 2 is not increased because of the need to accommodate the wire 22.

Figure 5:
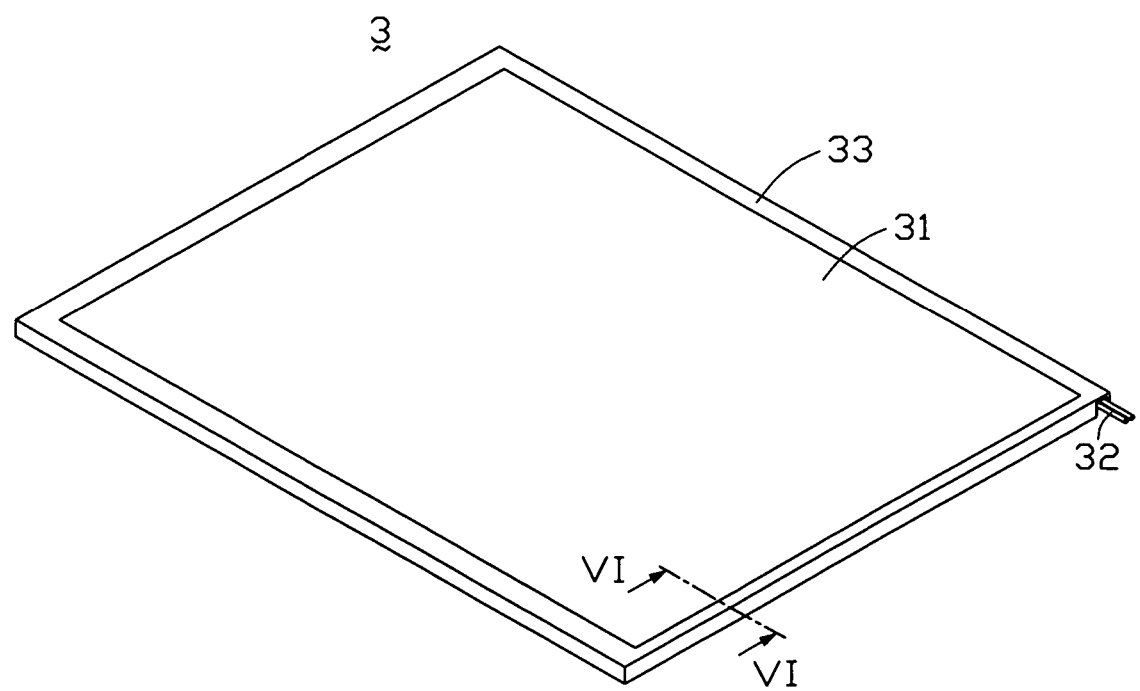
FIG. 5 is an isometric view of a backlight module according to a second embodiment of the present invention.
Figure 6:
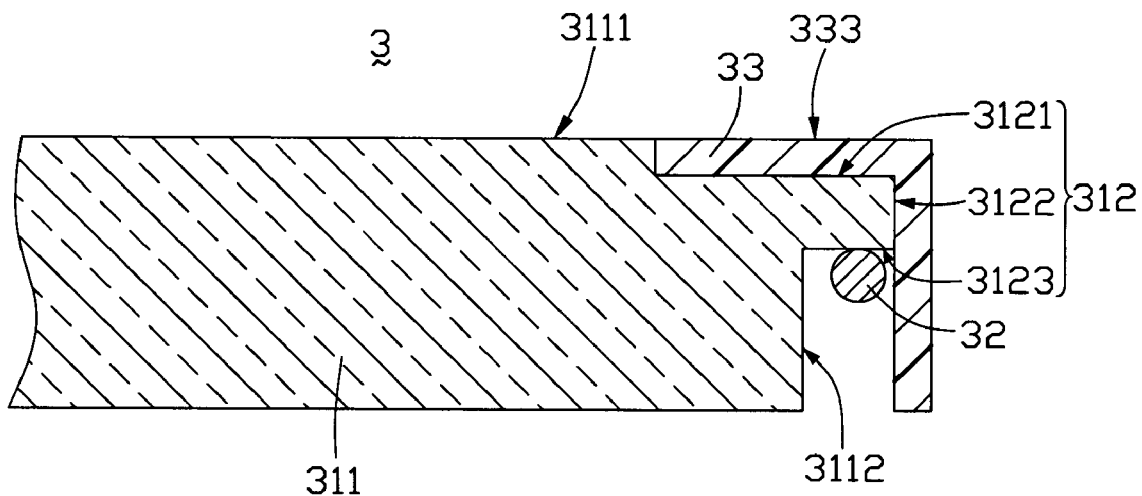
FIG. 6 is a cross-sectional view taken along line VI-VI of FIG. 5.

Referring to FIGS. 5 and 6, a backlight module 3 according to a second embodiment of the present invention includes a light guide plate 31, a light source (not shown) having a wire 32, and a plastic frame 33. The light guide plate 31 includes a body 311, and four protrusions 312 extending from the body 311. The body 311 includes a light emitting surface 3111, and two adjacent side surfaces 3112. Each pair of protrusions 312 are integrated with a respective one of the side surfaces 3112, and extend from the side surface 3112. Each protrusion 312 includes a first surface 3121, a second surface 3122, and a third surface 3123. The first surface 3121 of the protrusion 312 is in a lower plane than the emitting surface 3111; thereby, a step is defined between the emitting surface 3111 and the first surface 3121. The second surface 3122 interconnects the first and third surfaces 3121, 3123. The third surface 3123 is parallel and opposite to the first surface 3121. The plastic frame 33 has a top surface 333, and has a generally L-shaped transverse cross-section.

In assembly, two inner surfaces (not labeled) of the plastic frame 33 respectively cover the first and second surfaces 3121, 3122 of each protrusion 312, with the top surface 333 of the plastic frame 33 being in a same plane as the emitting surface 3111 of the body 311. The side surfaces 3112 of the body 311, the third surfaces 3123 of the protrusions 312, and the inner surfaces of the plastic frame 33 cooperatively define an L-shaped space for accommodating the wire 32 of the light source.

Further alternative embodiments may include the following. The light guide plate may include a body, and only two protrusions extending from the body at two side surfaces of the body respectively. The light guide plate may include a body, and three or five or more protrusions extending from the body at two side surfaces of the body. The body of the light guide plate may include two opposite light emitting surfaces. The body of the light guide plate may include only a single light incident surface. In such case, the light source can be a linear cold cathode fluorescent lamp, and the wire can be U-shaped. The body of the light guide plate may include three adjacent light incident surfaces. In such case, the light source can be a U-shaped cold cathode fluorescent lamp, and the wire can be linear. Each protrusion can be a generally rectangular block, or a block with one or more chamfers. The frame of the backlight module can be made from metal such as iron, copper, aluminum, or any alloy thereof.

Figure 7:
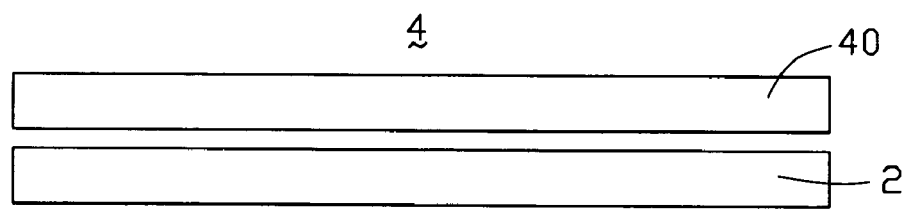
FIG. 7 is a schematic, side view of a liquid crystal display according to an exemplary embodiment of the present invention, the liquid crystal display including the backlight module of FIG. 1.
Figure 8:
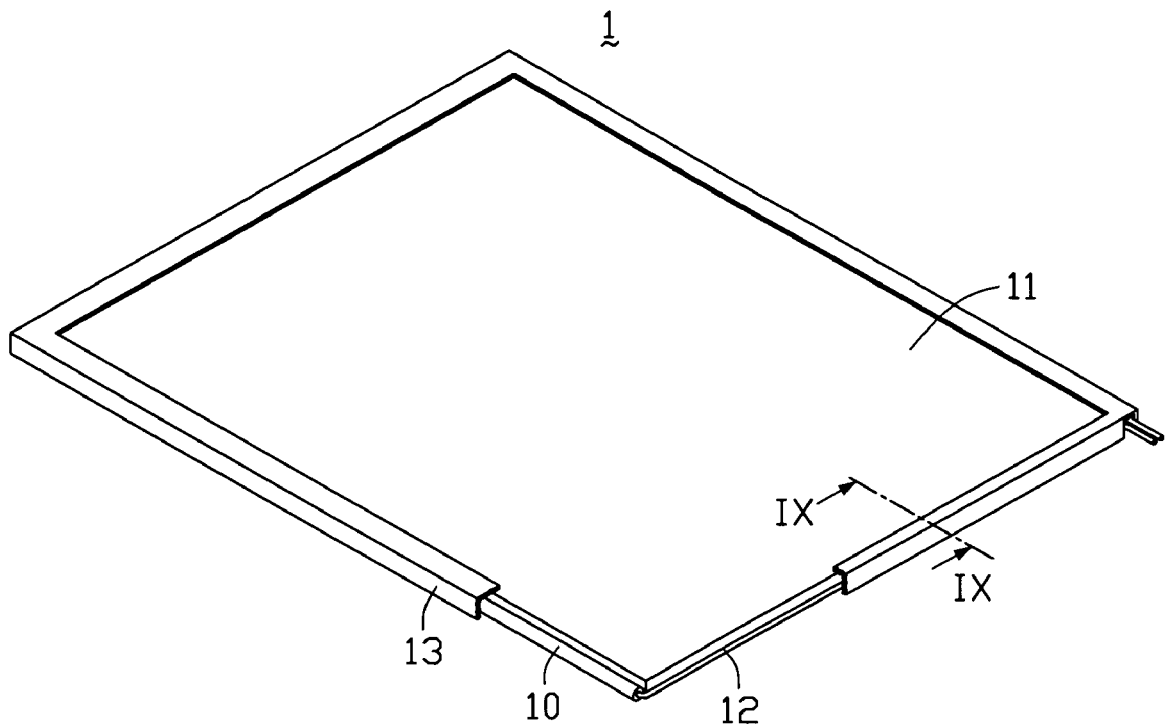
FIG. 8 is an isometric view of a conventional backlight module.
Figure 9:
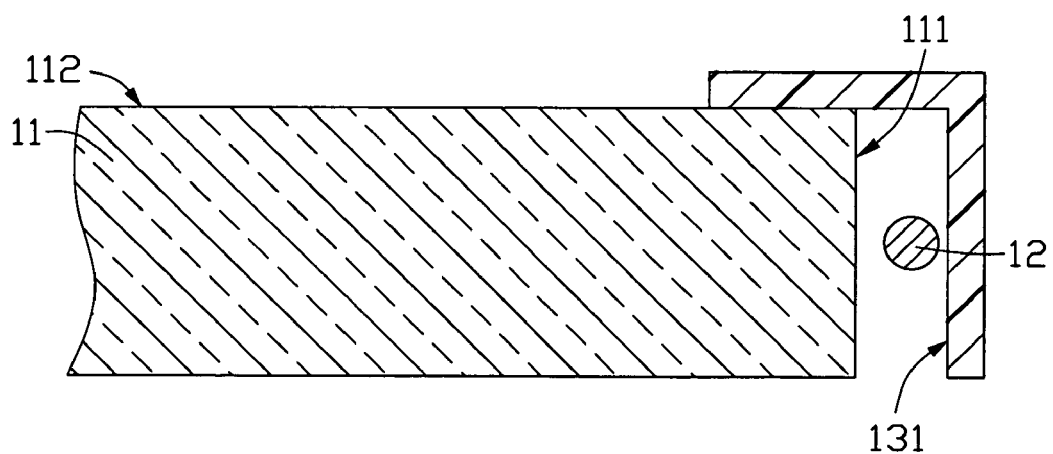
FIG. 9 is a cross-sectional view taken along line IX-IX of FIG. 8.

Referring to FIG. 7, a liquid crystal display 4 according to an exemplary embodiment of the present invention includes a liquid crystal panel 40, and the backlight module 2 disposed adjacent the liquid crystal panel 40 for illuminating the liquid crystal panel 40. In alternative embodiments, the backlight module 2 can instead be the backlight module 3, or any other alternative backlight module as described above.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module comprising:
    a light guide plate comprising a body and a protrusion extending from the body, the body comprising a light emitting surface and a side surface adjacent the light emitting surface;
    a light source having a wire, the wire being disposed in a space defined between the side surface and the protrusion; and
    a frame accommodating the light guide plate and the light source;
    wherein the frame, the protrusion and the side surface of the body cooperatively define the space.

2. The backlight module as claimed in claim 1, wherein the protrusion comprises a plurality of surfaces.

3. The backlight module as claimed in claim 2, wherein one of the surfaces of the protrusion is substantially in a some plane as the light emitting surface of the light guide plate.

4. The backlight module as claimed in claim 1, wherein the frame is plastic.

5. The backlight module as claimed in claim 1, wherein the frame is metallic.

6. The backlight module as claimed in claim 5, wherein the frame is made from iron, copper, aluminum, or any alloy thereof.

7. The backlight module as claimed in claim 1, wherein the light guide plate further comprises reflective material coated on the side surface.

8. A backlight module comprising:
    a light guide plate comprising a body and a protrusion extending from the body, the body comprising a light emitting surface, a side surface adjacent the light emitting surface, and two adjacent light incident surfaces perpendicular to the light emitting surface; and
    a generally L-shaped cold cathode fluorescent lamp disposed adjacent to the light incident surfaces, the cold cathode fluorescent lamp having a wire, the wire being disposed in a space defined between the side surface and the protrusion.

9. The backlight module as claimed in claim 8, wherein the wire in the space, essentially horizontally extends parallel to the light emitting surface of the light guide plate.

* * * * *